No. 665,362. Patented Jan. 1, 1901.
W. L. BLISS.
DRIVING MECHANISM FOR DYNAMOS.
(Application filed Apr. 2, 1900.)
(No Model.)

Witnesses:
George Barry Jr
Edward Vieser

Inventor:
William L. Bliss
by attorneys
Brown & Seward

UNITED STATES PATENT OFFICE.

WILLIAM L. BLISS, OF NEW YORK, N. Y., ASSIGNOR TO THE BLISS ELECTRIC CAR LIGHTING COMPANY, OF EAST ORANGE, NEW JERSEY.

DRIVING MECHANISM FOR DYNAMOS.

SPECIFICATION forming part of Letters Patent No. 665,362, dated January 1, 1901.

Application filed April 2, 1900. Serial No. 11,041. (No model.)

*To all whom it may concern:*

Be it known that I, WILLIAM L. BLISS, a citizen of the United States, and a resident of the borough of Brooklyn, in the city and State of New York, have invented new and useful Improvements in the Driving Mechanism for Dynamos, of which the following is a specification.

My invention relates to certain improvements in the structure, form, and arrangement of the several parts of a driving mechanism for dynamos located upon a railway-car, which has for its object the utilizing of the rotary motion of one of the axles of the car for illuminating or other purposes and which will permit the dynamo to be rigidly attached to the car frame or truck, where it is free from the effects of the sudden and destructive pounding of the car wheels and axles, and which dispenses with the use of unnecessary fittings and attachments in connection with car-axles.

A practical embodiment of my invention is represented in the accompanying drawings, in which—

Figure 1:
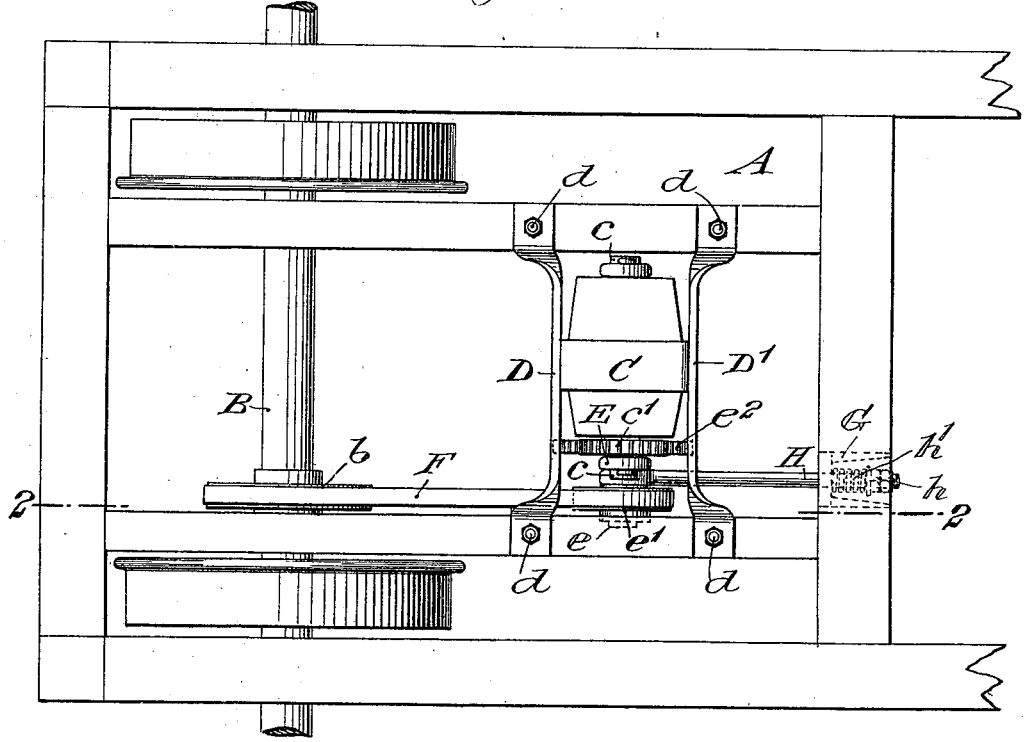
Figure 2:
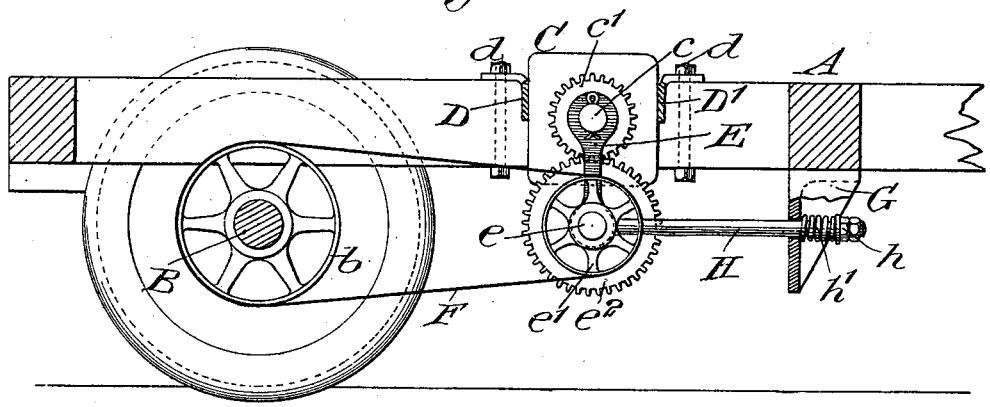

Figure 1 represents a plan view of a portion of a car frame or truck with a dynamo attached thereto and driving mechanism in connection therewith, and Fig. 2 is a vertical longitudinal section taken in the plane of the line 2 2 of Fig. 1.

The car frame or truck is denoted, as a whole, by A.

The car-axle is denoted by B, and it may be mounted in the usual manner. (Not shown herein.)

The dynamo is denoted by C, and it may be of any well-known or suitable kind, and it is supported rigidly upon the car frame or truck A, in the presence instance with its shaft $c$ parallel with the car-axle B.

The dynamo C is shown herein as being provided with two transversely-extended straps D D′, having their ends bolted, as shown at $d$, to a pair of longitudinally-extended girders or beams of the car frame or truck A. A rocking frame E is hinged concentric to the dynamo-shaft $c$. In the present instance this frame E supports a shaft $e$ in suitable bearings at its lower or free end, and the side bars of the frame are hinged upon the dynamo-shaft $c$. A pulley $e'$ is fixed to the shaft $e$ of the rocking frame E, which pulley is connected to the pulley $b$, fixed to the car-axle B, by means of a driving-belt F. The pulley $e'$ is geared to the dynamo-shaft $c$ by fixing a gear $e^2$ to the shaft $e$, which gear intermeshes with a smaller gear $c'$, fixed to the dynamo-shaft. Because of the rocking frame E being hinged concentric to the dynamo-shaft $c$ the gears will stay in mesh when the frame E is rocked toward or away from the car-wheel axle B.

The means which I employ for tending to swing the rocking frame E away from the axle B, so as to keep the driving-belt F at all times taut, is as follows: A depending bracket G is secured to one of the cross-beams of the car frame or truck A. A rod or bar H is engaged with the axle $e$ of the rocking frame E at a point between the pulley $e'$ and the gear $e^2$, which bar or rod extends through the bracket G and at this end is provided with one or more nuts $h$. A coil-spring $h'$ is interposed between the nuts $h$ and the bracket G, tending to draw the bar or rod H longitudinally away from the car-axle B. The tension of this spring can be adjusted to a fine degree by the screwing and unscrewing of the nuts $h$.

The required differences in size in the pulleys and gears may be made for obtaining the required reduction in speed from the car-axle to the dynamo-shaft.

It is evident that slight changes might be resorted to in the form and arrangement of the several parts without departing from the spirit and scope of my invention. Hence I do not wish to limit myself strictly to the structure herein set forth; but

What I claim is—

1. In combination a car frame or truck, a dynamo carried thereby, a dynamo-shaft, a rocking frame suspended vertically therefrom, intermeshing gears carried by the dynamo-shaft and the rocking frame, a pulley mounted in the rocking frame on the same axis as the gear carried by the frame, a car-axle, a pulley carried thereby, a belt connecting the car-axle pulley and the rocking-frame pulley and a spring connected with the rocking frame and tending to swing the pulley carried by the frame away from the pulley carried by the car-axle for keeping tension on the belt, substantially as set forth.

2. In combination, a car frame or truck, a dynamo carried thereby, a dynamo-shaft, a rocking frame hinged concentric to the dynamo-shaft, intermeshing gears carried by the dynamo-shaft and the rocking frame, a pulley carried by the rocking frame, a car-axle, a pulley carried thereby, a belt connecting the two pulleys and means tending to swing the rocking frame away from the car-axle for keeping tension on the belt, comprising a bracket carried by the car frame or truck, a bar or rod leading from the free end of the rocking frame through the said bracket and a spring interposed between the bracket and the end of the bar or rod, substantially as set forth.

In testimony that I claim the foregoing as my invention I have signed my name, in presence of two witnesses, this 20th day of March, 1900.

WILLIAM L. BLISS.

Witnesses:
FREDK. HAYNES,
EDWARD VIESER.